US012736160B1

(12) United States Patent
Henry

(10) Patent No.: US 12,736,160 B1
(45) Date of Patent: Sep. 15, 2026

(54) FITTING WITH A SEALING SLEEVE, AND ASSOCIATED ASSEMBLIES AND METHODS

(71) Applicant: Parker-Hannifin Corporation, Cleveland, OH (US)

(72) Inventor: Ty A. Henry, Atwater, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 19/348,903

(22) Filed: Oct. 3, 2025

Related U.S. Application Data

(60) Provisional application No. 63/703,924, filed on Oct. 5, 2024.

(51) Int. Cl.
*F16L 33/207* (2006.01)

(52) U.S. Cl.
CPC ................................ *F16L 33/2076* (2013.01)

(58) Field of Classification Search
CPC .......................... F16L 33/2076; F16L 33/2078
USPC ......................................................... 285/256
See application file for complete search history.

(56) References Cited

U.S. PATENT DOCUMENTS 5,317,799 A * 6/1994 Chapman ............ F16L 33/2076 285/256
10,281,072 B2 5/2019 Reinhardt
2006/0131878 A1* 6/2006 Wulf ................... F16L 33/2076 285/256
2009/0212559 A1* 8/2009 Werth ................. F16L 33/2071 285/256
2017/0159862 A1* 6/2017 Vizzarri .............. F16L 33/2076
2018/0224036 A1* 8/2018 Ramaswamy ...... F16L 33/2076
2021/0364111 A1* 11/2021 Müller ................ F16L 33/2078
2022/0290785 A1 9/2022 Sumiyoshi et al.
2025/0067376 A1 2/2025 Henry et al.

FOREIGN PATENT DOCUMENTS

GB 2638673 A 9/2025
WO 2024057587 A1 3/2024

OTHER PUBLICATIONS

Adium, "Plastic Hose Connector for Nipple Faucet", retrieved from the internet at: https://www.amazon.in/Connector-Leakage-Plastic-Connecting-Professional/dp/B0C32ZQCJ6 on Oct. 6, 2025.

* cited by examiner

*Primary Examiner* — Zachary T Dragicevich
(74) *Attorney, Agent, or Firm* — McDonnell Boehnen Hulbert & Berghoff LLP

(57) ABSTRACT

An example fitting includes: a shell; a nipple disposed within the shell such that an internal annular space is formed between the shell and the nipple; and a sealing sleeve disposed in the internal annular space, wherein the sealing sleeve has a generally cylindrical shape and is made of a flexible material, wherein an annular space is formed between the sealing sleeve and the nipple to receive a hose in the annular space, allowing the sealing sleeve to form a sealed connection with the hose upon crimping the shell onto the hose.

20 Claims, 6 Drawing Sheets

600

PROVIDING A FITTING COMPRISING: (I) A SHELL, AND (II) A NIPPLE DISPOSED WITHIN THE SHELL SUCH THAT AN INTERNAL ANNULAR SPACE IS FORMED BETWEEN THE SHELL AND THE NIPPLE

602

INSERTING A SEALING SLEEVE IN THE INTERNAL ANNULAR SPACE OR MOUNTING THE SEALING SLEEVE TO A HOSE, WHEREIN THE SEALING SLEEVE HAS A GENERALLY CYLINDRICAL SHAPE AND IS MADE OF A FLEXIBLE MATERIAL, WHEREIN AN ANNULAR SPACE IS FORMED BETWEEN THE SEALING SLEEVE AND THE NIPPLE

604

INSERTING THE HOSE INTO THE ANNULAR SPACE SUCH THAT THE SEALING SLEEVE IS RADIALLY INTERPOSED BETWEEN THE HOSE AND THE SHELL

606

CRIMPING THE SHELL ONTO THE HOSE, THEREBY ALLOWING THE SEALING SLEEVE TO FORM A SEALED CONNECTION WITH THE HOSE

608

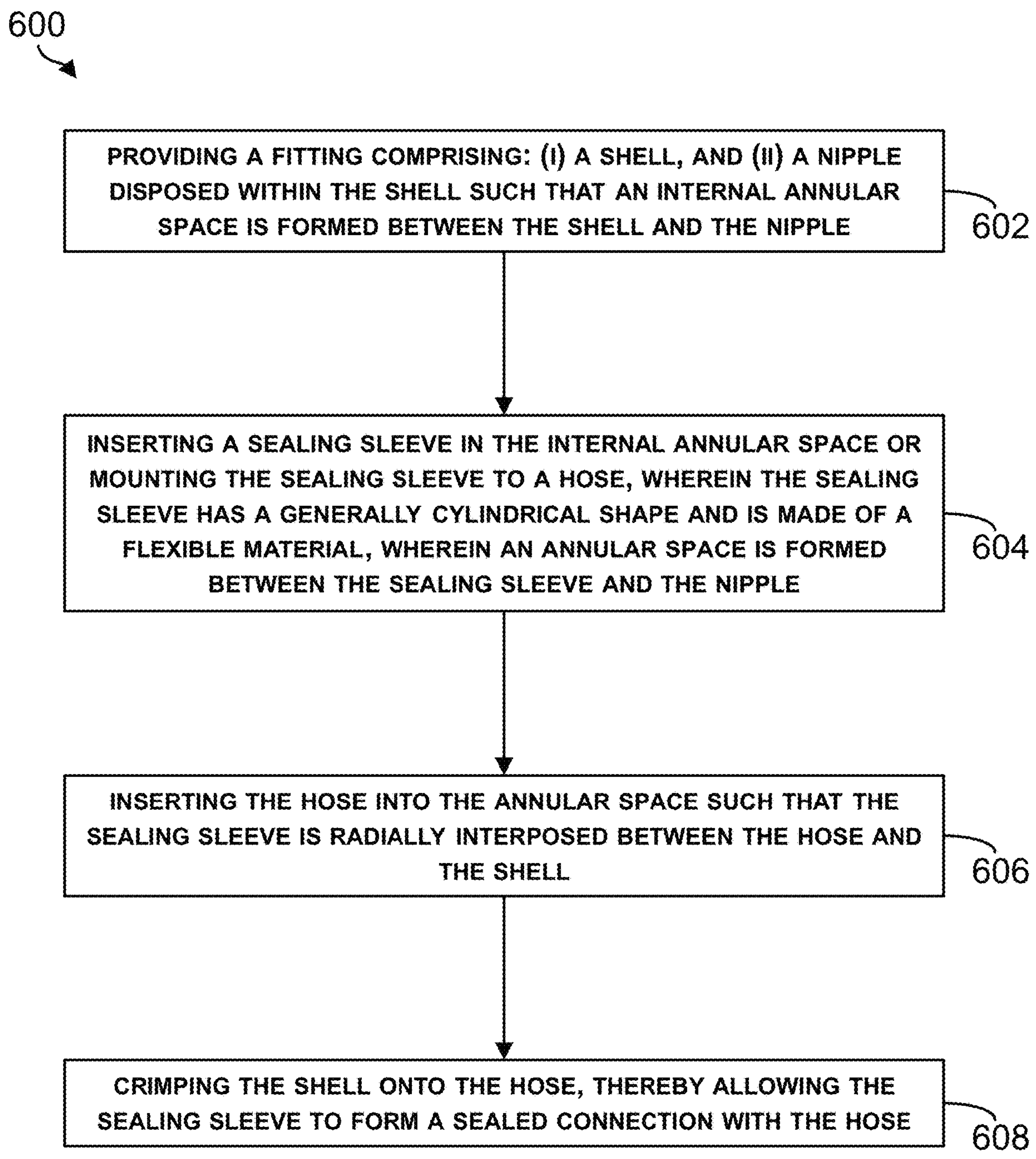

FIG. 7

FITTING WITH A SEALING SLEEVE, AND ASSOCIATED ASSEMBLIES AND METHODS

CROSS REFERENCE TO RELATED APPLICATION

The present application claims priority to U.S. Provisional Patent Application No. 63/703,924, filed on Oct. 5, 2024, the entire contents of which are herein incorporated by reference as if fully set forth in this description.

BACKGROUND

Many countries and companies have set goals to achieve reduced carbon emissions or net zero carbon in the future. Hydrogen used as a fuel is considered a primary solution for de-carbonization efforts.

Applications (e.g., trucks or other vehicles) using hydrogen as a fuel may have hoses to transfer hydrogen between different components of a system. Fittings are used to couple such hoses to different system components. It may be desirable to have a hose-fitting configuration that forms an effective seal to prevent hydrogen or other gas leakage. However, forming an effective sealing, especially at low temperatures with high pressure gas, can be challenging, and the hoses can lose a significant amount of sealing force due to temperature variations.

To reduce gas permeation in such hoses, an inner layer or tube of the hose can be made of a thermoplastic material to lower effusion rate of highly permeable gases like hydrogen or Compressed Natural Gas (CNG). As such, it might not be desirable to use a material such as polytetrafluoroethylene (PTFE) as it might have unacceptable permeation rates. While tubes made of fluoropolymers have improved sealing, materials such as polyetheretherketone (PEEK) are extremely stiff and are not suitable for larger size hoses. Further, while adding a cover to the hose may help with sealing, it might not be desirable in some cases to add a cover to the hose because cover stiffness disproportionately affects the overall hose stiffness.

It may thus be desirable to have a configuration that forms an effective seal without negatively affecting flexibility and permeation rate of a hose. It is with respect to these and other considerations that the disclosure made herein is presented.

SUMMARY

The present disclosure describes implementations that relate to a fitting with a sealing sleeve, and associated assemblies and methods.

In a first example implementation, the present disclosure describes a fitting. The fitting includes: a shell; a nipple disposed within the shell such that an internal annular space is formed between the shell and the nipple; and a sealing sleeve disposed in the internal annular space, wherein the sealing sleeve has a generally cylindrical shape and is made of a flexible material, wherein an annular space is formed between the sealing sleeve and the nipple to receive a hose in the annular space, allowing the sealing sleeve to form a sealed connection with the hose upon crimping the shell onto the hose.

In a second example implementation, the present disclosure describes an assembly of a hose with the fitting of the first example implementation.

In a third example implementation, the present disclosure also describes a method of forming the fitting of the first example implementation or the assembly of the second example implementation.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 7 is a flowchart of a method for forming the assembly of FIGS. 6A-6B, according to an example implementation.

DETAILED DESCRIPTION

Disclosed herein are fittings, assemblies, and methods associated with using a sealing sleeve assembled to a fitting between a shell of the fitting and a hose coupled to the fitting. The sealing sleeve is configured as an additional layer that aids in sealing the hose to a nipple of the fitting when the shell of the fitting is crimped. Adding such a sealing sleeve may enhance hose-to-fitting sealing, and may eliminate low-temperature leakage without adding stiffness to the hose.

In an example, the sealing sleeve is made of an elastomeric material (fluoropolymer, vulcanized elastomer, thermoplastic) to be flexible, facilitating assembly to a fitting and hose. In one example, the sealing sleeve may have a slit that allows the sealing sleeve to be compressed and expanded during assembly. This configuration may facilitate insertion of the sealing sleeve into the shell of the fitting by hand without tooling.

In an example, the sealing sleeve may have a ridge to allow for locking the sealing sleeve in place once the sealing sleeve reaches a fully-inserted position within the shell and to anchor the sealing sleeve to the shell before crimping. In some examples, the sealing sleeve may be color coded, or may have a particular color, to identify the media (e.g., the type of fluid/gas) flowing within the hose.

Figure 1:
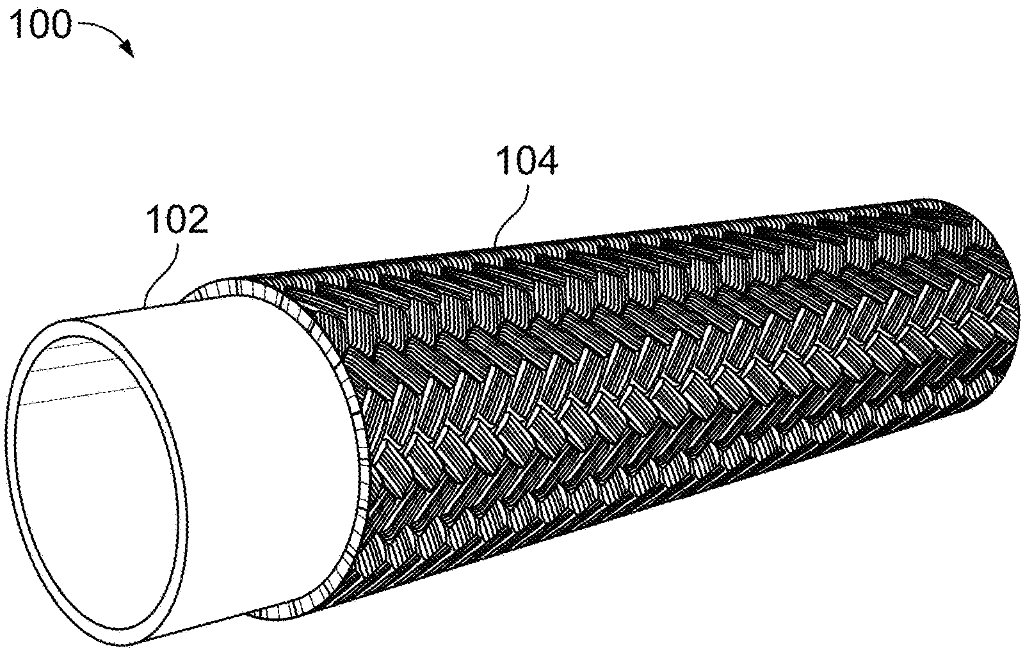
FIG. 1 illustrates a perspective view of a hose, according to an example implementation.

FIG. 1 illustrates a perspective view of a hose 100, according to an example implementation. The hose 100 is configured to be used in applications involving transfer of natural gas, CNG, propane, or hydrogen-enriched natural gas (HNG), which is a mixture of natural gas and hydrogen. A certain percentage of HNG is composed of hydrogen, creating a fuel with potentially lower emissions compared to pure natural gas when burned.

In the example implementation of FIG. 1, the hose 100 has an inner tube 102 surrounded by a reinforcement layer 104. The inner tube 102 is a smooth tube as shown in FIG. 1 and may be made of a thermoplastic material.

The inner tube 102 is configured to have low gas permeation characteristics. The inner tube 102 may also allow for tight bend radiuses, which may be desirable in on-vehicle, mobile and stationary equipment, fuel cells, and internal combustion engine environments having tight spaces, for example. The inner tube 102 may also have low-leachate characteristics, which may be desirable in a fuel cell application. In some examples, the inner tube 102 is electrically conductive.

The reinforcement layer 104 is configured as a structural reinforcement layer. In an example, the reinforcement layer 104 is provided as a braided structure that is wound, and/or wrapped around (e.g., in direct contact with) the inner tube 102. In an example, the reinforcement layer 104 can include a plurality of layers, where the thickness and/or number of reinforcement layers can be selected based on the desired mechanical properties, including a desired level of flexibility. In an example, the reinforcement layer 104 is made of stainless steel.

In some examples, an additional cover layer (not shown) may be added around the reinforcement layer 104. Such outer cover layer may be an outermost layer of the hose 100. It may be desirable for such cover layer to be made of a thin, flexible material to avoid increasing the stiffness of the hose 100. In other examples, however, the hose 100 might not have an outer cover layer, and the reinforcement layer 104 is thus the outermost layer in such examples.

The hose 100 is configured to be mounted or coupled to a fitting. Such fitting may facilitate coupling the hose 100 to a manifold or other components of a fluid system. In conventional configurations, as the inner tube 102 is subjected to large temperature swings and subjected to low temperatures (e.g., −40° C. or colder), it may be challenging to maintain an effective sealing force with a mating fitting. It may thus be desirable to configure the fitting in a manner that provides an effective sealing with the hose 100 regardless of temperature levels and variations in temperature.

Figure 2A:
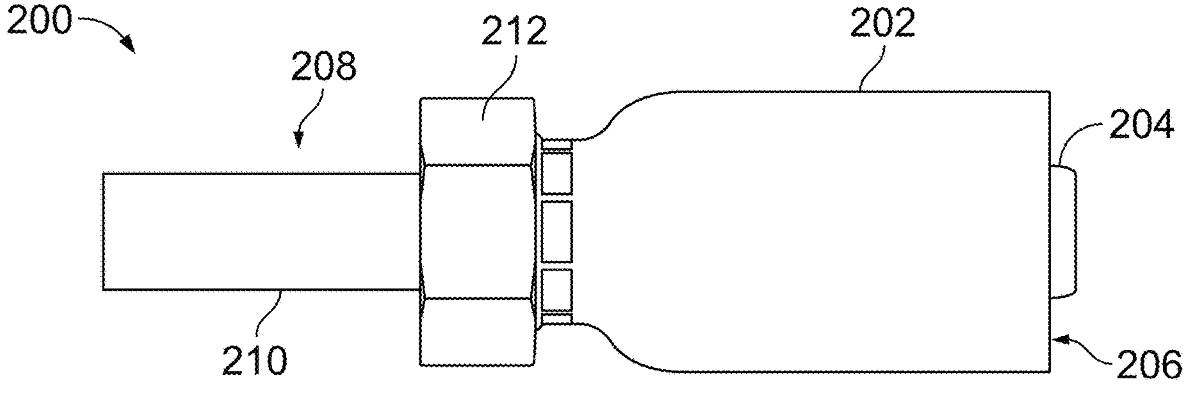
FIG. 2A illustrates a side view of a fitting, according to an example implementation.

FIG. 2A illustrates a side view of a fitting 200, according to an example implementation. The fitting 200 has a shell 202 in which a nipple 204 is disposed such that an internal annular space 206 is formed between the shell 202 and the nipple 204. A hose such as the hose 100 can then be inserted into the internal annular space 206, and the shell 202 is then crimped to retain the hose 100 within the fitting 200 and form a sealed connection.

In an example, the nipple 204 is a short length of pipe that receives the hose 100 thereon. The nipple 204 can be made from various materials like steel, brass, or plastic. In an example, the nipple 204 can be configured as a male portion with external threads screw into female threads formed within the fitting 200.

The fitting 200 also has an end connector 208 that facilitates connecting the fitting 200 to other components, such as a manifold, another tube, or any other fluid system component. In the example implementation of FIG. 2, the end connector 208 has a tube stub portion 210 and a hex body 212. However, other end connector configurations are contemplated. For example the end connector 208 can be configured as a threaded connector, a swivel end connector, etc.

To enhance forming a sealing connection with the hose 100, the fitting 200 further includes a sealing sleeve configured to be inserted into the internal annular space 206 as described below. To facilitate retaining the sealing sleeve, the shell 202 may have internal grooves or similar retaining features.

Figure 2B:
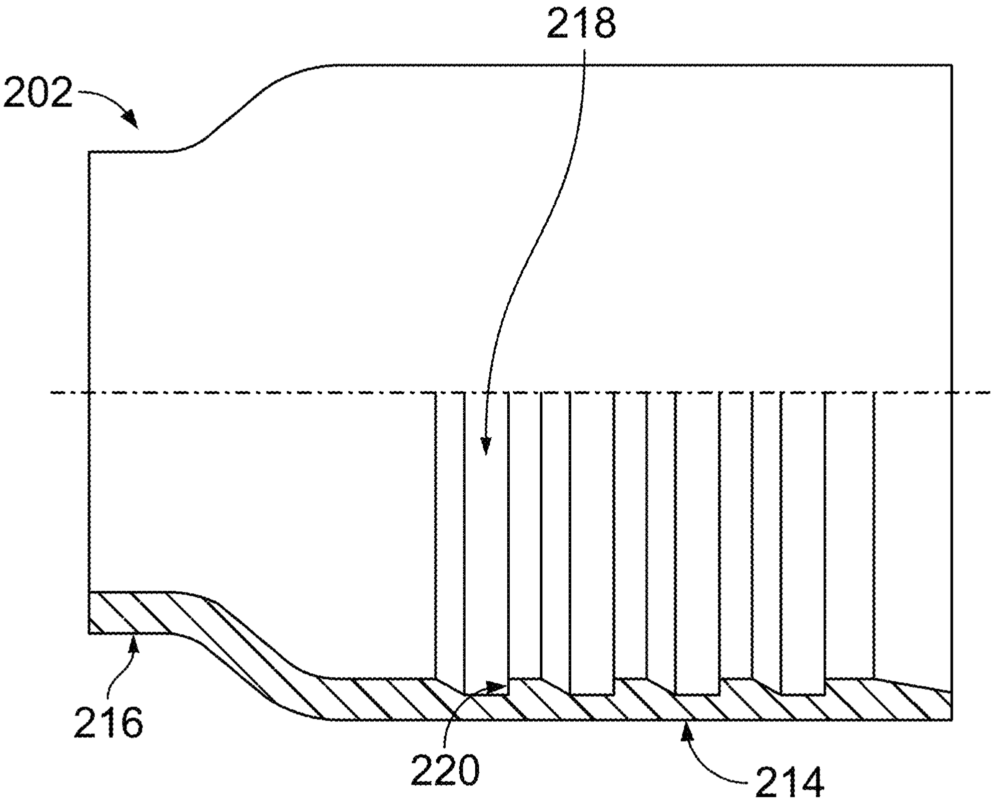
FIG. 2B illustrates a partial cross-sectional side view of a shell of the fitting of FIG. 2A, according to an example implementation.

FIG. 2B illustrates a partial cross-sectional side view of the shell 202 of the fitting 200, according to an example implementation. As shown, the shell 202 is generally cylindrical with a first shell portion 214 having a larger diameter than a second shell portion 216 that interfaces with the hex body 212 of the end connector 208.

The first shell portion 214 has several internal grooves, such as internal groove 218. Due to formation of the grooves, shoulders such as shoulder 220 are formed. As described below, the shoulder 220 may facilitate retaining the sealing sleeve within the shell 202.

Figure 3:
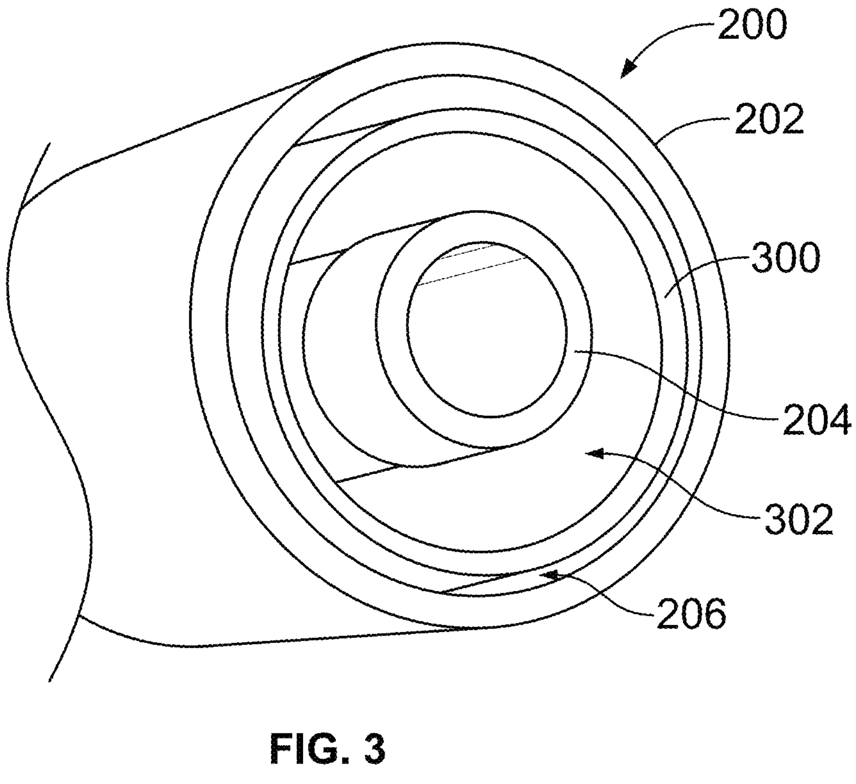
FIG. 3 illustrates a perspective view of the fitting of FIG. 2A with a sealing sleeve disposed in an internal annular space within a shell of the fitting, according to an example implementation.

FIG. 3 illustrates a perspective view of the fitting 200 with a sealing sleeve 300 disposed in the internal annular space 206, according to an example implementation. As shown in FIG. 3, an annular space 302 is formed between the sealing sleeve 300 and the nipple 204. The hose 100 can be inserted into the annular space 302 as described in more detail below.

Figure 4A:
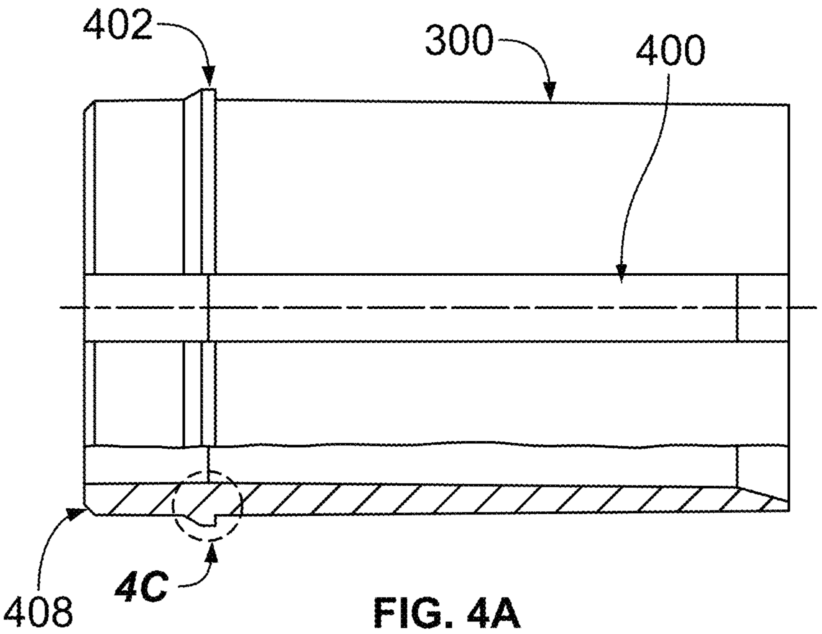
FIG. 4A illustrates a partial cross-sectional side view of the sealing sleeve of FIG. 3, according to an example implementation.
Figure 4B:
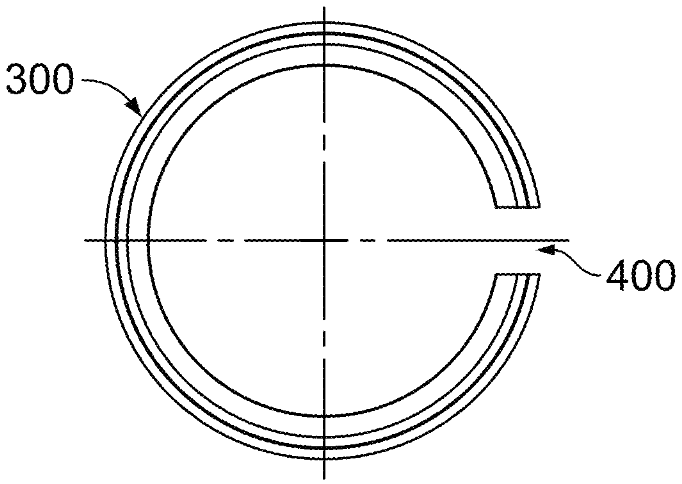
FIG. 4B illustrates a front view of the sealing sleeve of FIG. 4A, according to an example implementation.
Figure 4C:
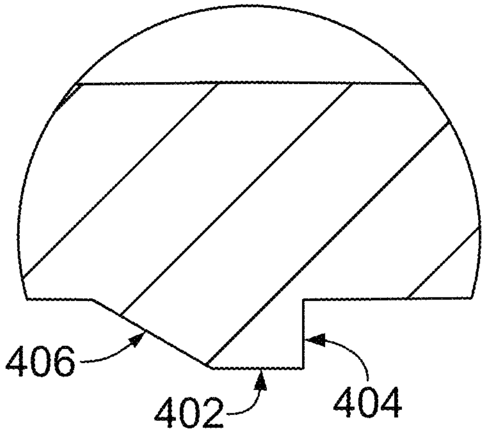
FIG. 4C illustrates a partial cross-sectional view of the sealing sleeve of FIGS. 4A-4C, according to an example implementation.

FIG. 4A illustrates a partial cross-sectional side view of the sealing sleeve 300, FIG. 4B illustrates a front view of the sealing sleeve 300, and FIG. 4C illustrates a partial cross-sectional view of the sealing sleeve 300, according to an example implementation. Particularly, FIG. 4C shows an enlarged portion of the sealing sleeve 300 to illustrate construction details.

As shown in FIGS. 4A-4B, the sealing sleeve 300 can be configured to have a generally cylindrical shape. In an example, the sealing sleeve 300 is made of a flexible material. For instance, the sealing sleeve 300 can be made of an elastomeric (fluoropolymer, vulcanized elastomer, thermoplastic) material.

As a particular example, the sealing sleeve 300 can be made of polyamide 11 (PA 11), which is also known as nylon 11. PA 11 is a high-performance, durable, and versatile plastic material that is made from renewable castor beans. PA 11 is chemically and mechanically heat resistant, has desirable chemical resistance, and is dimensionally stable. It also has a smooth finish that is preferable in applications that require a fine, detailed surface. The sealing sleeve 300 can be extruded, machined, or 3D-printed, as examples.

In an example, the sealing sleeve 300 has a slit 400, which may be formed on a side of the sealing sleeve 300. As shown, the slit 400 causes a gap to be formed, which allows the sealing sleeve 300 to be radially compressed and expanded to facilitate insertion into the shell 202 of the fitting 200, allowing for ease of assembly.

Particularly, as the sealing sleeve 300 is inserted into the shell 202 of the fitting 200, an internal groove and associated ridge formed by the interior surface of the shell 202 (see FIG. 2B) cause the sealing sleeve 300 to be compressed, which is allowed by the slit 400. The sealing sleeve 300 can expand, then be compressed again as it interacts with the following internal ridge, and so on, until the sealing sleeve 300 reaches its fully inserted position shown in FIG. 3. This way, the sealing sleeve 300 can be inserted by an operator without using a tool.

In an example, the sealing sleeve 300 may further include at least one external ridge, such as ridge 402, formed in an exterior surface of the sealing sleeve 300. Once, the sealing sleeve 300 reaches the fully-inserted position, the ridge 402 interacts with the shoulder 220 of the internal groove 218 of the shell 202 to retain the sealing sleeve 300 in position. Particularly, the ridge 402 forms a shoulder 404 as shown in FIG. 4C that interfaces with the shoulder 220 within the shell 202, thus preventing the sealing sleeve 300 from moving back. Rather, the sealing sleeve 300 is locked and anchored in position before crimping the shell 202 onto the hose 100.

As shown in FIG. 4C, the ridge 402 may have a tapered portion or chamfer 406. The chamfer 406 may facilitate traversal of the sealing sleeve 300 as it interacts with the interior surface of the shell 202. Particularly, the chamfer 406 slides against the internal wall portions separating the internal grooves of the shell 202 as the sealing sleeve 300 is being inserted axially into the fitting 200.

In an example, an end of the sealing sleeve 300 may also have a respective chamfer 408 as shown in FIG. 4A. The respective chamfer 408 may also facilitate insertion of the sealing sleeve 300 into the fitting 200 as the sealing sleeve 300 interacts with the interior surface of the shell 202.

In one example, the sealing sleeve 300 may be color coded to identify the media flowing through the hose 100. For example, the sealing sleeve 300 may be made in an orange color to indicate that the hose 100 is used for an HNG system. In another application, the sealing sleeve 300 may be made in a black color to indicate that the hose 100 is used for propane transfer, and so on.

In one example, the sealing sleeve 300 can be inserted into the internal annular space 206 of the fitting 200 prior to insertion of the hose 100. In other example, the sealing sleeve 300 can be mounted to the hose 100 first, and the hose 100 is then inserted into to the internal annular space 206. Then, the sealing sleeve 300 is slid into the internal annular space 206 until it is fully inserted and retained in the position shown in FIG. 3.

Figure 5:
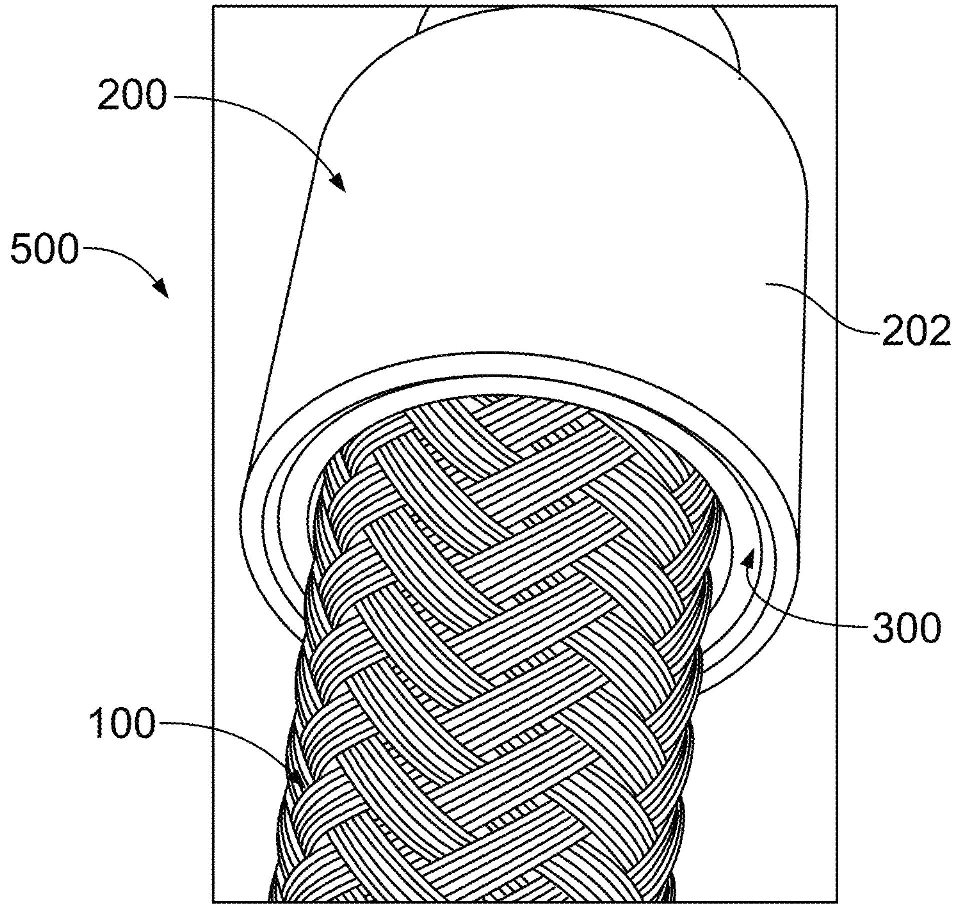
FIG. 5 illustrates an assembly of the hose of FIG. 1 and the fitting of FIG. 2A prior to crimping, according to an example implementation.

FIG. 5 illustrates an assembly 500 of the hose 100 and the fitting 200 prior to crimping, according to an example implementation. The assembly 500 is shown in a partially finished state where the hose 100 is inserted into the fitting 200, with the sealing sleeve 300 radially interposed between the hose 100 and the interior surface of the shell 202. The shell 202 is shown in a pre-crimped stated. Once the hose 100 is in position, the shell 202 can be crimped.

Figure 6A:
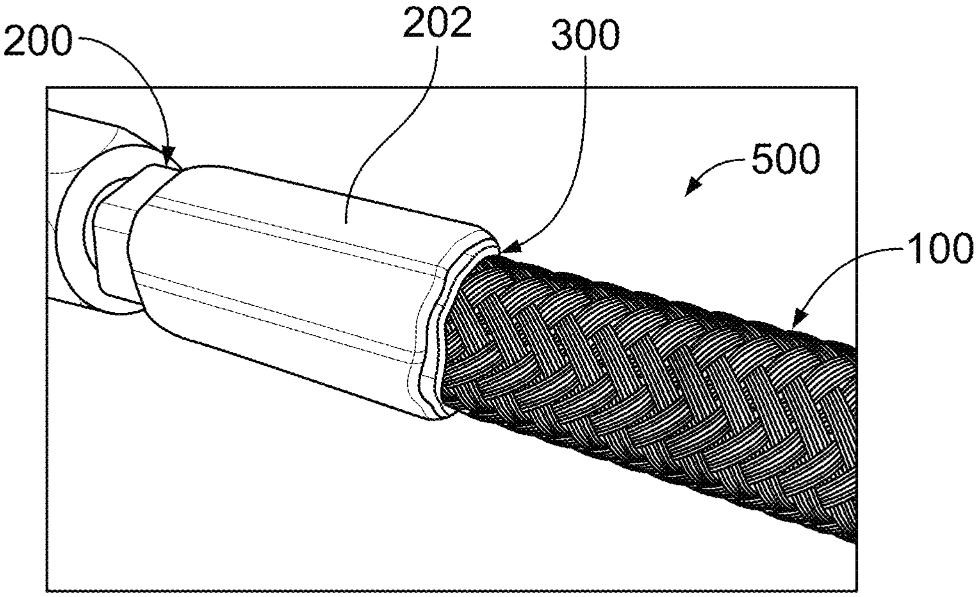
FIG. 6A illustrates a perspective view of the assembly of FIG. 5 after crimping, according to an example implementation.
Figure 6B:
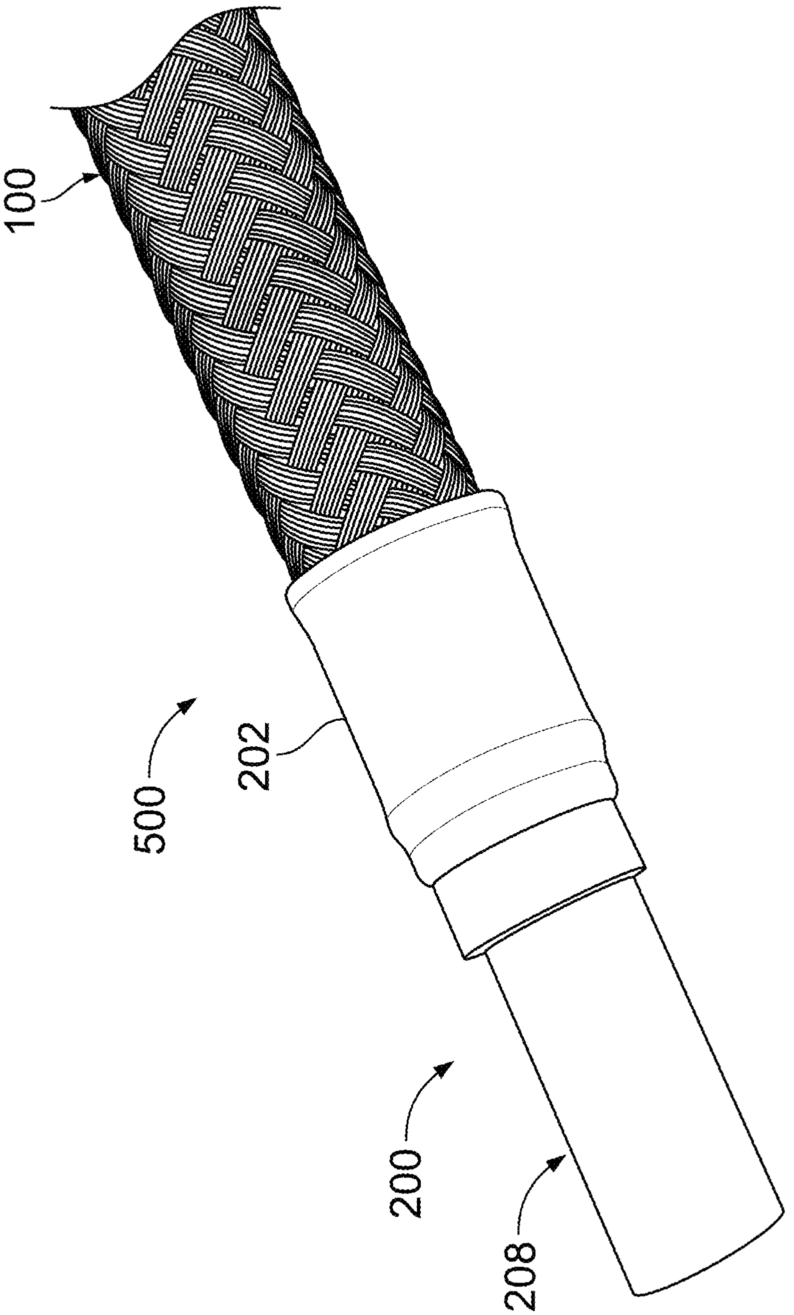
FIG. 6B illustrates another perspective view of the assembly of FIG. 6A after crimping, according to an example implementation.

FIG. 6A illustrates a perspective view of the assembly 500 of the hose 100 and the fitting 200 after crimping, and FIG. 6B illustrates another perspective view of the assembly 500 after crimping, according to an example implementation. As shown, the shell 202 has been crimped using a crimping tool, thereby squeezing the sealing sleeve 300 onto the hose 100 and forming an effective seal, while retaining the hose 100 within the fitting 200.

In this manner, the sealing sleeve 300 is added to the fitting 200 to transfer compression for both retention and sealing between the shell 202 (after it has been crimped) and the exterior surface of the hose 100 (e.g., of the reinforcement layer 104). The sealing sleeve 300 may thus enhance sealing of high pressure gas at extreme temperatures.

FIG. 7 is a flowchart of a method 600 for forming the assembly 500 of FIGS. 6A-6B, according to an example implementation.

The method 600 may include one or more operations, functions, or actions as illustrated by one or more of blocks 602-608. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 602, the method 600 includes providing the fitting 200 comprising: (i) the shell 202, and (ii) the nipple 204 disposed within the shell 202 such that the internal annular space 206 is formed between the shell 202 and the nipple 204.

The term "providing" as used herein, and for example with regard to any component such as the fitting 200 includes any action to make the component available for use, such as bringing the component to an apparatus or to a work environment for further processing (e.g., mounting it to other components or mounting other components to it).

At block 604, the method 600 includes inserting the sealing sleeve 300 in the internal annular space 206 or mounting the sealing sleeve 300 to a hose (e.g., the hose 100), wherein the sealing sleeve 300 has a generally cylindrical shape and is made of a flexible material, wherein the annular space 302 is formed between the sealing sleeve 300 and the nipple 204.

At block 606, the method 600 includes inserting the hose into the annular space 302 such that the sealing sleeve 300 is radially interposed between the hose and the shell 202.

At block 608, the method 600 includes crimping the shell 202 onto the hose, thereby allowing the sealing sleeve 300 to form a sealed connection with the hose.

The method 600 can further include any of the other steps or operations described throughout herein.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform actuators presented in the figures. In some instances, components of the devices and/or systems may be configured to perform the actuators such that the components are actually configured and structured (with hardware and/or software) to enable such performance. In other examples, components of the devices and/or systems may be arranged to be adapted to, capable of, or suited for performing the actuators, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to those with skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a fitting comprising: a shell; a nipple disposed within the shell such that an internal annular space is formed between the shell and the nipple; and a sealing sleeve disposed in the internal annular space, wherein the sealing sleeve has a generally cylindrical shape and is made of a flexible material, wherein an annular space is formed between the sealing sleeve and the nipple to receive a hose in the annular space, allowing the sealing sleeve to form a sealed connection with the hose upon crimping the shell onto the hose.

EEE 2 is the fitting of EEE 1, wherein the shell has at least one internal groove, and wherein the sealing sleeve has at least one ridge such that as the sealing sleeve is inserted into the shell, the at least one ridge interacts with the at least one internal groove to retain the sealing sleeve within the shell.

EEE 3 is the fitting of any of EEEs 1-2, wherein the sealing sleeve has a slit that allows the sealing sleeve to be radially compressed and expanded to facilitate insertion into the shell.

EEE 4 is the fitting of any of EEEs 1-3, wherein the sealing sleeve is made of an elastomeric material.

EEE 5 is the fitting of EEE 4, wherein the elastomeric material is a fluoropolymer, a vulcanized elastomer, or a thermoplastic material.

EEE 6 is the fitting of any of EEEs 1-5, wherein the sealing sleeve has a particular color that indicates a type of fluid to be transferred through the hose.

EEE 7 is the fitting of any of EEEs 1-6, further comprising: an end connector configured to couple the fitting to another component.

EEE 8 is an assembly comprising: the fitting of any of EEEs 1-7. For example, the fitting comprises: (i) a shell, (ii) a nipple disposed within the shell such that an internal annular space is formed between the shell and the nipple, and (iii) a sealing sleeve disposed in the internal annular space, wherein the sealing sleeve has a generally cylindrical shape and is made of a flexible material, wherein an annular space is formed between the sealing sleeve and the nipple. The assembly also comprises: a hose inserted into the annular space, allowing the sealing sleeve to form a sealed connection with the hose upon crimping the shell onto the hose.

EEE 9 is the assembly of EEE 8, wherein the hose has an inner tube and a reinforcement layer surrounding the inner tube, and wherein the sealing sleeve is squeezed against the reinforcement layer, forming the sealed connection, upon crimping the shell of the fitting.

EEE 10 is the assembly of any of EEEs 8-9, wherein the shell has at least one internal groove, and wherein the sealing sleeve has at least one ridge such that as the sealing sleeve is inserted into the shell, the at least one ridge interacts with the at least one internal groove to retain the sealing sleeve within the shell.

EEE 11 is the assembly of any of EEEs 8-10, wherein the sealing sleeve has a slit that allows the sealing sleeve to be radially compressed and expanded to facilitate insertion into the shell.

EEE 12 is the assembly of any of EEEs 8-11, wherein the sealing sleeve is made of an elastomeric material.

EEE 13 is the assembly of EEE 12, wherein the elastomeric material is a fluoropolymer, a vulcanized elastomer, or a thermoplastic material.

EEE 14 is the assembly of any of EEEs 8-13, wherein the sealing sleeve has a particular color that indicates a type of fluid to be transferred through the hose.

EEE 15 is the assembly of any of EEEs 8-14, wherein the fitting further comprises: an end connector configured to couple the fitting to another component.

EEE 16 is a method of forming the assembly of any of EEEs 8-15. For example, the method comprises: providing a fitting comprising: (i) a shell, and (ii) a nipple disposed within the shell such that an internal annular space is formed between the shell and the nipple; inserting a sealing sleeve in the internal annular space or mounting the sealing sleeve to a hose, wherein the sealing sleeve has a generally cylindrical shape and is made of a flexible material, wherein an annular space is formed between the sealing sleeve and the nipple; inserting the hose into the annular space such that the sealing sleeve is radially interposed between the hose and the shell; and crimping the shell onto the hose, thereby allowing the sealing sleeve to form a sealed connection with the hose.

EEE 17 is the method of EEE 16, wherein the shell has at least one internal groove, and wherein the sealing sleeve has at least one ridge, wherein inserting the sealing sleeve into the internal annular space comprises causing the at least one ridge to interact with the at least one internal groove to retain the sealing sleeve within the shell.

EEE 18 is the method of any of EEEs 16-17, wherein the sealing sleeve has a slit, and wherein inserting the sealing sleeve into the shell comprises: radially compressing, due to the slit, the sealing sleeve to facilitate insertion into the shell.

EEE 19 is the method of any of EEEs 16-18, wherein the sealing sleeve is made of an elastomeric material comprising a fluoropolymer, a vulcanized elastomer, or a thermoplastic material.

EEE 20 is the method of any of EEEs 16-19, wherein the fitting has an end connector, and wherein the method further comprises: coupling the fitting to another component using the end connector.

What is claimed is:

1. A fitting comprising:

a shell having at least one internal groove;

a nipple disposed within the shell such that an internal annular space is formed between the shell and the nipple; and a sealing sleeve disposed in the internal annular space, wherein the sealing sleeve has a generally cylindrical shape and is made of a flexible material, wherein the sealing sleeve has at least one ridge such that as the sealing sleeve is inserted into the shell, the at least one ridge interacts with the at least one internal groove to retain the sealing sleeve within the shell, wherein an annular space is formed between the sealing sleeve and the nipple to receive a hose in the annular space, allowing the sealing sleeve to form a sealed connection with the hose upon crimping the shell onto the hose.

2. The fitting of claim 1, wherein the shell has at least one internal groove of the shell is ramped to facilitate traversal of the sealing sleeve as the sealing sleeve interacts with an interior surface of the shell during insertion.

3. The fitting of claim 1, wherein the sealing sleeve has a slit that allows the sealing sleeve to be radially compressed and expanded to facilitate insertion into the shell.

4. The fitting of claim 1, wherein the sealing sleeve is made of an elastomeric material.

5. The fitting of claim 4, wherein the elastomeric material is a fluoropolymer, a vulcanized elastomer, or a thermoplastic material.

6. The fitting of claim 1, wherein the sealing sleeve has a particular color that indicates a type of fluid to be transferred through the hose.

7. The fitting of claim 1, further comprising:

an end connector configured to couple the fitting to another component.

8. An assembly comprising:

a fitting comprising: (i) a shell having at least one internal groove, (ii) a nipple disposed within the shell such that an internal annular space is formed between the shell and the nipple, and (iii) a sealing sleeve disposed in the internal annular space, wherein the sealing sleeve has a generally cylindrical shape and is made of a flexible material, wherein the sealing sleeve has at least one ridge such that as the sealing sleeve is inserted into the shell, the at least one ridge interacts with the at least one internal groove to retain the sealing sleeve within the shell, wherein an annular space is formed between the sealing sleeve and the nipple; and a hose inserted into the annular space, allowing the sealing sleeve to form a sealed connection with the hose upon crimping the shell onto the hose.

9. The assembly of claim 8, wherein the hose has an inner tube and a reinforcement layer surrounding the inner tube, and wherein the sealing sleeve is squeezed against the reinforcement layer, forming the sealed connection, upon crimping the shell of the fitting.

10. The assembly of claim 8, wherein the shell has at least one internal groove of the shell is ramped to facilitate traversal of the sealing sleeve as the sealing sleeve interacts with an interior surface of the shell during insertion.

11. The assembly of claim 8, wherein the sealing sleeve has a slit that allows the sealing sleeve to be radially compressed and expanded to facilitate insertion into the shell.

12. The assembly of claim 8, wherein the sealing sleeve is made of an elastomeric material.

13. The assembly of claim 12, wherein the elastomeric material is a fluoropolymer, a vulcanized elastomer, or a thermoplastic material.

14. The assembly of claim 8, wherein the sealing sleeve has a particular color that indicates a type of fluid to be transferred through the hose.

15. The assembly of claim 8, wherein the fitting further comprises:

an end connector configured to couple the fitting to another component.

16. A method comprising:

providing a fitting comprising: (i) a shell, and (ii) a nipple disposed within the shell such that an internal annular space is formed between the shell and the nipple, wherein the shell has at least one internal groove;

inserting a sealing sleeve in the internal annular space or mounting the sealing sleeve to a hose, wherein the sealing sleeve has a generally cylindrical shape and is made of a flexible material, wherein the sealing sleeve has at least one ridge, wherein inserting the sealing sleeve into the internal annular space comprises causing the at least one ridge to interact with the at least one internal groove to retain the sealing sleeve within the shell, wherein an annular space is formed between the sealing sleeve and the nipple;

inserting the hose into the annular space such that the sealing sleeve is radially interposed between the hose and the shell; and crimping the shell onto the hose, thereby allowing the sealing sleeve to form a sealed connection with the hose.

17. The method of claim 16, wherein the at least one internal groove of the shell is ramped to facilitate traversal of the sealing sleeve as the sealing sleeve interacts with an interior surface of the shell during insertion.

18. The method of claim 16, wherein the sealing sleeve has a slit, and wherein inserting the sealing sleeve into the shell comprises:

radially compressing, due to the slit, the sealing sleeve to facilitate insertion into the shell.

19. The method of claim 16, wherein the sealing sleeve is made of an elastomeric material comprising a fluoropolymer, a vulcanized elastomer, or a thermoplastic material.

20. The method of claim 16, wherein the fitting has an end connector, and wherein the method further comprises:

coupling the fitting to another component using the end connector.

* * * * *